July 28, 1931.   R. B. BOURNE   1,816,109
SILENCER
Filed Nov. 6, 1928
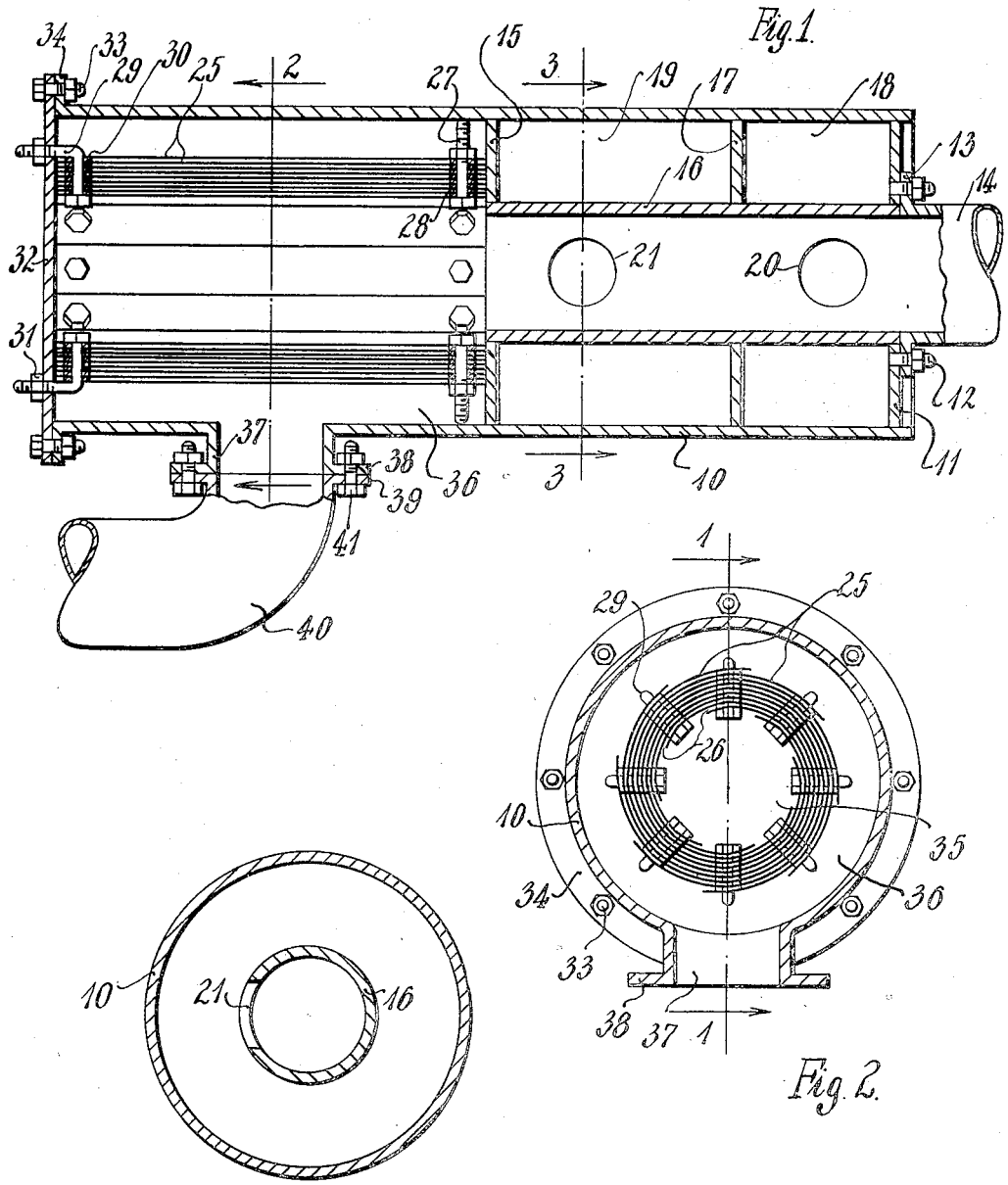
INVENTOR.
Roland B Bourne
BY
Chapin & Neal
ATTORNEYS.

Patented July 28, 1931

1,816,109

UNITED STATES PATENT OFFICE

ROLAND B. BOURNE, OF HARTFORD, CONNECTICUT, ASSIGNOR, BY MESNE ASSIGNMENTS, TO THE MAXIM SILENCER COMPANY, OF HARTFORD, CONNECTICUT, A CORPORATION OF CONNECTICUT

SILENCER

Application filed November 6, 1928. Serial No. 317,618.

This invention relates to apparatus for silencing audible sounds such as are emitted from the exhaust system of internal combustion engines, the intake system of blowers, or from other forms of apparatus. It is likewise adaptable to the suppression of sub-audible vibrations resulting from similar sources. One object of the invention is the producton of an apparatus of this character having improved silencing or vibration suppressing characteristics. A further object is the production of an apparatus of this character having great simplicity of construction. A further object is the production of an apparatus of this character by which the suppression of sounds or other vibrations may be increased for certain selected frequencies. A further object is the production of apparatus of this character which can be cleaned with facility, thereby avoiding the difficulties inherent in certain prior devices which tended to become clogged after continuous use in the exhaust system of internal combustion engines. Other and further objects of the invention will appear from the following description and claims.

Referring to the drawings:

Fig. 1 is a longitudinal section through a device embodying my invention taken upon line 1—1 of Fig. 2;

Fig. 2 is a transverse section through the device taken upon the line 2—2 of Fig. 1; and Fig. 3 is a transverse section through the device taken upon line 3—3 of Fig. 1.

The improved silencing device, in the embodiment shown in the drawings, is mounted within a casing 10 having a closure plate 11 welded to it at one end. This plate carries bolts 12 serving as a means of attachment for the flange 13 of a pipe 14. This pipe may be the exhaust pipe of an internal combustion motor or the inlet pipe of a blower, but is preferably the means by which the silencing device is attached to the apparatus to be silenced. The silencing unit may, however, be reversed if desired—the pipe 14 in this case serving as the connection to the atmosphere.

Within the casing 10 at a point spaced from the closure plate 11 is a partition 15 preferably welded in place. A pipe 16 extends from the closure plate to this partition and is likewise preferably welded so as to form a permanent fluid-tight joint. A second partition 17 is welded in place between the closure plate 11 and the partition 15, thereby forming annular chambers 18 and 19 surrounding the central pipe 16. Holes 20 and 21 in the pipe serve to connect the central opening of the pipe with these annular chambers which are thus caused to act as acoustic side branches for sound or sub-audible vibrations passing along the pipe.

A plurality of plates 25 are coiled into overlapping spirals and are spaced from each other in a manner to be described, so as to provide between them spiral passages 26. The ends of these plates abut the partition 15 at one end which thus forms an end wall for the passages. Bolts 27 pass through holes in the plates and abut the inner surface of the casing 10, washers 28 being interposed between the plates so as to maintain the proper spacing. A second series of bolts 29 likewise pass through holes in the plates and insure proper separation of the plates by means of washers 30. The bolts of this second series are bent at right angles and are clamped by nuts 31 to an end plate 32 which in turn is held by bolts 33 to a flange 34 formed upon the casing 10.

The series of plates 25, as clearly shown in Fig. 2, form a central chamber 35 in alignment with the pipe 16 and are spaced sufficiently from the inner wall of the casing 10 to form an annular chamber 36 coaxial with but spaced from the chamber 35. These two chambers are joined by the spiral passages 26 between the plates. The plates 25 abut the partition 15 at one end and the end wall 32 at the other end, so that the gas attempting to travel between the chambers 35 and 36 is forced to divide and pass through the plurality of passages 26. During this passage a considerable attenuation of sound waves, particularly those of the higher frequencies, takes place.

At one side of the casing 10, at a point substantially midway of the length of the plates 25, is an opening 37 surrounded by a flange 38. The flange 39 of an outlet pipe 40 is secured to the flange 38 by means of bolts 41. The position of the opening 37 specified is preferred, as the longitudinal center of the chamber 36 is a nodal point for sound waves traversing this chamber and, therefore, a minimum amount of energy from these vibrations will be passed out through the opening 37.

It will be seen that sound waves entering the pipe 14 will first pass by the side branches 18 and 19 which act to remove or neutralize certain frequencies. In the drawings the chambers 18 and 19 have been shown as of different axial length, so that they exert their effects upon different frequencies. The dimensions and, therefore, the frequencies eliminated may be varied according to the particular case to which the apparatus is to be applied. After passing these side branches, the sound waves enter the chamber 35 and pass therefrom through the spiral passages 26. A considerable attenuation of the higher frequencies results during this passage. It will be observed that the outer ends of the passages 26 are spaced at different distances from the opening 37, the interference of sound waves thereby resulting likewise aiding in the attenuation of those vibrations which finally pass out the pipe 40. The effect of the nodal position of the opening has been referred to above.

In prior devices of this general character, much difficulty has been experienced due to the tendency of the smaller passages to become clogged, and the impracticability of cleaning them in most types of construction. In the devices shown, the small passages 26 can be cleaned readily by removing the end plate 32, it not being necessary to disturb the piping during this operation. This feature of the construction permits a silencer of this general character to be installed in locations which otherwise would be unsuited for the application of a silencing unit.

What I claim is:

1. A silencing device having a plurality of coaxial chambers connected by spiral passageways, an axial opening into the inner of said chambers, and a single lateral opening in the wall of the outer of said chambers, said lateral opening being restricted in its area to a zone surrounding a nodal point for sound vibrations in the outer chamber and leaving a substantial amount of unbroken wall space on both sides thereof in said wall in a direction parallel to the axis of the chamber.

2. A silencing device comprising a casing, an axial passage leading through said casing, a plurality of side chambers connected by openings to the axial passage, a structure presenting a plurality of spiral passageways leading from the axial passage to an outer chamber coaxial therewith, and an outlet opening formed in the side of the casing leading into said outer chamber.

3. A silencing device comprising a casing, an axial passage leading through said casing, a plurality of side chambers connected by openings to the axial passage, a structure presenting a plurality of spiral passageways leading from the axial passage to an outer chamber coaxial therewith, and an outlet opening formed in the side of the casing leading into said outer chamber, the sides of said spiral passageways and one end of the casing being closed by a single end plate.

4. A silencing device comprising a casing, an axial passage leading through said casing, a plurality of side chambers connected by openings to the axial passage, a structure presenting a plurality of spiral passageways leading from the axial passage to an outer chamber coaxial therewith, and an outlet opening formed in the side of the casing leading into said outer chamber, the outlet opening being located at a nodal point for sound vibrations occurring in the outer chamber.

5. A silencing device comprising a casing, an axial passage leading through said casing, a plurality of side chambers connected by openings to the axial passage, a structure presenting a plurality of spiral passageways leading from the axial passage to an outer chamber coaxial therewith, and an outlet opening formed in the side of the casing leading into said outer chamber, the outer ends of said spiral passageways being located at varying distances from said side opening.

6. A silencing device comprising a generally cylindrical casing, an axial passage leading through said casing, a plurality of side chambers connected by openings to the axial passage, a structure presenting a plurality of spiral passageways surrounding the axial passage and being itself surrounded by an annular chamber, an opening in the side of the casing leading into the annular chamber, and an end plate normally covering an end of the casing and removable without disturbing piping connections to the axial or annular chambers to permit cleaning of the passageway-containing structure.

In testimony whereof I have affixed my signature.

ROLAND B. BOURNE.